(12) United States Patent
Asai et al.

(10) Patent No.: US 9,677,642 B2
(45) Date of Patent: Jun. 13, 2017

(54) TORQUE DAMPER APPARATUS

(71) Applicant: KABUSHIKI KAISHA F.C.C., Hamamatsu-shi, Shizuoka (JP)

(72) Inventors: Hiroshi Asai, Hamamatsu (JP); Shingo Abe, Hamamatsu (JP); Hiromi Fujiwara, Hamamatsu (JP); Junichi Fukada, Hamamatsu (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 14/828,924

(22) Filed: Aug. 18, 2015

(65) Prior Publication Data

US 2015/0354665 A1    Dec. 10, 2015

Related U.S. Application Data

(63) Continuation of application No. PCT/JP2014/053667, filed on Feb. 17, 2014.

(30) Foreign Application Priority Data

Feb. 18, 2013  (JP) .................................. 2013-029455

(51) Int. Cl.
  *F16H 45/02*  (2006.01)
  *F16F 15/134*  (2006.01)
  (Continued)

(52) U.S. Cl.
  CPC .... *F16F 15/13476* (2013.01); *F16F 15/1207* (2013.01); *F16F 15/12313* (2013.01);
  (Continued)

(58) Field of Classification Search
  CPC ... F16F 15/134; F16F 15/13476; F16H 45/02; F16H 2045/0205; F16H 2045/0221; F16H 2045/0278
  (Continued)

(56) References Cited

U.S. PATENT DOCUMENTS 4,360,352 A * 11/1982 Lamarche ........... F16F 15/1234
                                                    192/213
5,590,750 A *  1/1997 Graton ................. F16F 15/129
                                                    192/3.29 X
(Continued)

FOREIGN PATENT DOCUMENTS

JP      2002-048217        2/2002
JP      2009-068604        4/2009
(Continued)

OTHER PUBLICATIONS

International Search Report dated Aug. 21, 2014 for PCT/JP2014/053667.

*Primary Examiner* — Gregory Binda
(74) *Attorney, Agent, or Firm* — Knobbe Martens Olson & Bear, LLP (57) ABSTRACT

In some embodiments, a torque damper apparatus can achieve reduced stiffness as well as sufficient vibration absorbing property while increasing the dampening ratio of the torque variation. In some embodiments, a torque damper apparatus comprises an input member to which an engine torque is inputted; damper springs able to absorb variation of torque inputted from the input member; and/or a driving power of the engine configured to be transmitted to an output shaft of a vehicle via the input member and the damper springs. The damper springs can comprise a plurality of coil springs arranged along the circumference of the input member. The torque damper apparatus can further comprise a plurality of separate members interposed between the damper springs and configured to be independently rotated with respect to each other when the engine torque is transmitted thereto.

8 Claims, 12 Drawing Sheets

(51) Int. Cl.
F16F 15/12 (2006.01)
F16F 15/123 (2006.01)

(52) U.S. Cl.
CPC ..... *F16H 45/02* (2013.01); *F16H 2045/0205* (2013.01); *F16H 2045/0221* (2013.01); *F16H 2045/0278* (2013.01)

(58) Field of Classification Search
USPC .............. 464/66.1, 68.9, 67.1; 192/3.29, 213
See application file for complete search history.

(56) References Cited

U.S. PATENT DOCUMENTS

| | | | |
|---|---|---|---|
| 7,241,225 B2 * | 7/2007 | Ronner | F16F 15/13453 464/67.1 |
| 2016/0061306 A1 * | 3/2016 | Kawahara | F16F 15/12373 |
| 2016/0102744 A1 * | 4/2016 | Kawahara | F16F 15/12366 |

FOREIGN PATENT DOCUMENTS

| | | |
|---|---|---|
| JP | 2011-099545 | 5/2011 |
| WO | WO 2011/062158 A1 | 5/2011 |

* cited by examiner

TORQUE DAMPER APPARATUS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTIONS

Field of the Inventions

The present inventions relate to torque damper apparatuses for transmitting the driving power of an engine to an output shaft of a vehicle via an input member and damper springs.

Description of the Related Art

A torque converter used in an automobile (e.g., a mainly Automatic Transmission (AT) vehicle) has a torque converter cover for containing operating fluid under a liquid-tight condition in which a pump rotating together with the torque converter cover, a turbine arranged oppositely to the pump, and a stator connected to an one-way clutch. The torque converter is structured so that rotation of the pump is transmitted to the turbine via the operating fluid with amplifying the transmitting torque. Accordingly, the driving power of the engine can be amplified via the operating fluid and transmitted to a transmission and driving wheels of the vehicle.

A lock-up clutch apparatus (e.g., torque damper apparatus) is arranged within the torque converter cover of the torque converter and is intended to reduce torque transmitting loss as compared with that performed via operating fluid by directly connecting the torque converter cover and the turbine at an arbitrary timing. That is, the lock-up clutch apparatus has a clutch piston connected to the turbine and can be moved between a connected position, in which the clutch piston is contacted with an inner wall of the torque converter cover, and a separated position in which the clutch piston is separated from the torque converter cover. When the lock-up clutch apparatus is in the connected position, the torque converter cover and the turbine are directly connected (e.g., mechanically connected) via the clutch piston.

Damper springs are arranged in the usual lock-up clutch apparatus for absorbing the torque variation from the engine when the torque converter cover and the turbine are directly connected. Usually, the damper springs comprise coil springs arranged in a circular arc along the periphery of the clutch piston so that the damper springs can displace (e.g., extension and contraction displacement) to absorb the torque variation transmitted from the engine.

There is one example of a lock-up clutch of the prior art (e.g. disclosed in JP 2002-48217 A) which comprises a piston (e.g., input member) to which engine torque is inputted, elastic members (e.g., damper springs) for absorbing torque variation of torque inputted from the piston, and a rotational output member (e.g., output member) for outputting torque transmitted via the elastic members. The lock-up clutch is structured so that the driving power of engine can be transmitted via the piston, elastic members and rotational output member.

In such a lock-up clutch apparatus of the prior art, a support member is provided which is separated from both the piston and the rotational output member and is rotatable relative to them. This lock-up clutch apparatus is able to set a large torsional angle by arranging the elastic members in series and functioning the support member as an intermediate float member to reduce the whole stiffness of the torque damper apparatus and to improve the vibration absorbing performance.

SUMMARY OF THE INVENTIONS

Because the torque damper apparatus of the prior art is provided with a single support member only, it does not obtain sufficiently high vibration absorbing performance for further improving the whole stiffness of the torque damper apparatus and for the dampening ratio of the torque variation. Such a problem is not limited to the lock-up clutch apparatus arranged within the torque converter, but is common to the whole of the torque damper apparatus for absorbing the torque variation from the engine.

Thus, it can be beneficial to provide a torque damper apparatus which can achieve further reduction of its stiffness as well as sufficient vibration absorbing property while increasing the dampening ratio of the torque variation.

Thus, in some embodiments, a torque damper apparatus can include an input member to which an engine torque is inputted. The torque damper apparatus can include damper springs able to absorb variation of torque inputted from the input member. In some embodiments of the torque damper apparatus, a driving power of the engine can be transmitted to an output shaft of a vehicle via the input member and the damper springs. In some embodiments, the damper springs comprise a plurality of coil springs arranged along the circumference of the input member. In some embodiments, the torque damper apparatus comprises a plurality of separate members interposed between the damper springs. In some embodiments, the plurality of separate members are able to be independently rotated relative to each other when the engine torque is transmitted thereto.

In some embodiments, the damper springs comprise straight coil springs each having a substantially linear configuration relative to its extension and contraction direction.

In some embodiments, the separate members comprise a first separate member and a second separate member. In some embodiments, the damper springs comprise a first damper spring, a second damper spring and a third damper spring. In some embodiments, the torque inputted from the input member is outputted to the output shaft via the first damper spring, the first separate member, the second damper spring, the second separate member and the third damper spring.

In some embodiments, the first separate member has an outer wall portion positioned at an outer side of the damper springs so that it opposes to the outer side surfaces of the damper springs. In some embodiments, the second separate member has an inner wall portion positioned at an inner side of the damper springs so that it opposes the inner side surfaces of the damper springs.

In some embodiments, the input member comprises a clutch piston arranged within a torque converter cover and adapted to be moved between a connected position and a separated position relative to the torque converter cover so that the clutch piston can be rotated by the torque transmitted from the engine in the connected position to transmit the engine torque to a turbine of the torque converter.

According to some embodiments, since the damper springs comprises a plurality of coil springs (e.g., first, second and third damper springs) arranged along the circumference of the input member (e.g., clutch piston) and the torque damper apparatus comprises a plurality of separate members interposed between the damper springs and able to be independently rotated with respect to each other when the engine torque is transmitted thereto, it is possible to further reduce the stiffness of the torque damper apparatus and additionally to obtain sufficient vibration absorbing property while increasing the dampening ratio of torque variation.

According to some embodiments, since the damper springs comprise straight coil springs each having a substantially linear configuration relative to its extension and contraction direction, it is possible to suppress slide contact of the coil springs against the wall surface of the clutch piston during absorption of the torque variation and thus to reduce the sliding resistance. Accordingly, it is possible to reduce hysteresis torque of the damper springs and thus to further increase the dampening ratio of the torque variation.

According to some embodiments, since the separate members comprise a first separate member and a second separate member, the damper springs comprise a first damper spring, a second damper spring and a third damper spring, and the torque inputted from the input member is outputted to the output shaft via the first damper spring, the first separate member, the second damper spring, the second separate member and the third damper spring, it is possible to achieve further reduction of the stiffness of the torque damper apparatus by a simple structure and to obtain sufficient vibration absorbing property while increasing the dampening ratio of torque variation.

According to some embodiments, since the first separate member has an outer wall portion positioned at an outer side of the damper springs so that it opposes to the outer side surfaces of the damper springs, and the second separate member has an inner wall portion positioned at an inner side of the damper springs so that it opposes the inner side surfaces of the damper springs, it is possible to firmly hold the damper springs between wall portions of the first and second separate members.

According to some embodiments, since the input member comprises a clutch piston arranged within a torque converter cover and adapted to be moved between a connected position and a separated position relative to the torque converter cover so that the clutch piston can be rotated by the torque transmitted from the engine in the connected position to transmit the engine torque to a turbine of the torque converter, it is possible to apply the torque damper apparatus of the present invention to a lock-up clutch apparatus of the torque converter.

DETAILED DESCRIPTION OF THE PREFERRED EMBODIMENTS

Preferable embodiments including various combinations of the present inventions are described below with reference to the accompanying drawings.

A lock-up clutch apparatus 10 as a torque damper apparatus, in accordance with some embodiments, is arranged within a torque converter 1 (e.g., fluid coupling) and can comprise a clutch piston 11 as an input member, a first separate member 14, a second separate member 15, and/or damper springs (e.g., first, second and third damper springs S1 to S3), as shown in FIGS. 1-8. The lock-up clutch apparatus 10 can be configured to directly transmit engine torque inputted to a torque converter cover 5 to a turbine 3 via the clutch piston 11, the first separate member 14, the second separate member 15 and the damper springs when the clutch piston 11 is in the connected position.

Figure 1:
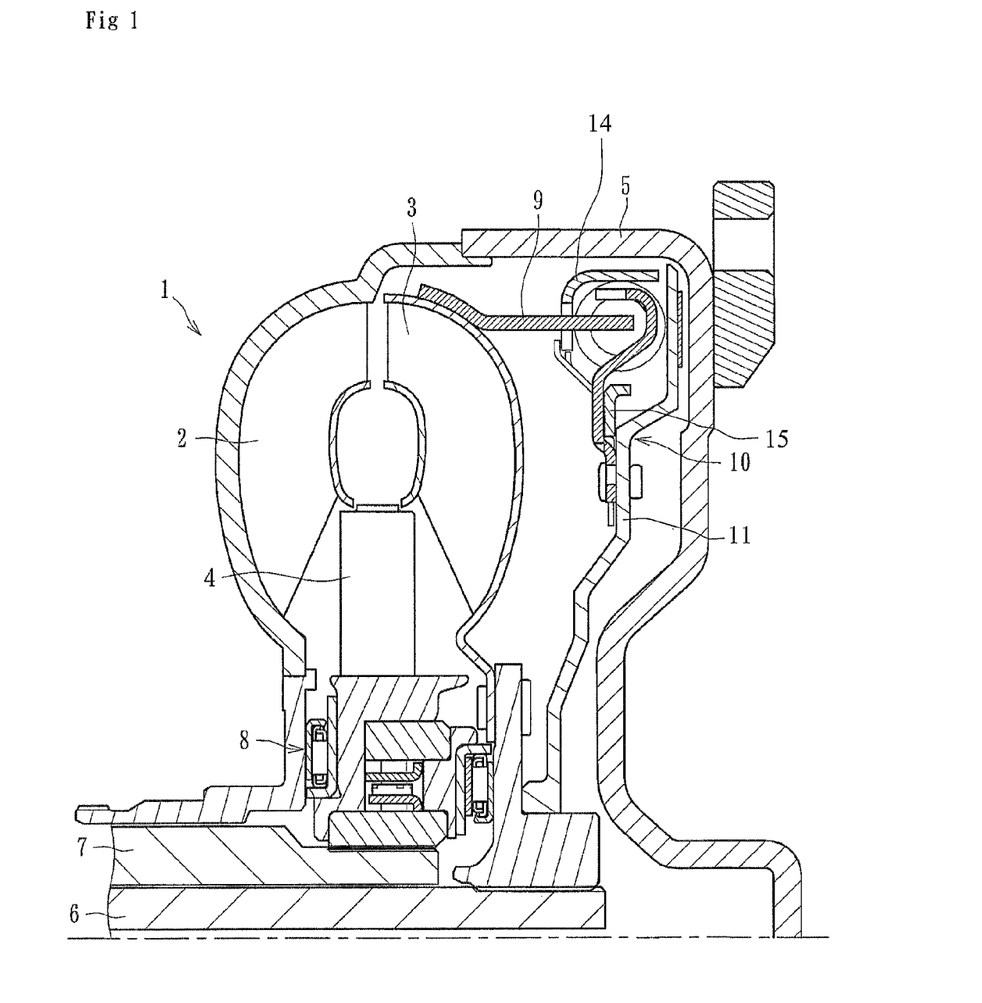
FIG. 1 is a longitudinal section view of a lock-up clutch apparatus of a preferable embodiment of the present inventions.

The torque converter 1 can be used in an automobile (e.g., a mainly AT vehicle) to transmit the engine torque to a transmission while amplifying the engine torque. The torque converter 1 can comprise the torque converter cover 5. The torque converter cover 5 can contain operating fluid in a sealed manner and can be rotatable around an output shaft 6 by a driving power transmitted thereto. In some embodiments, the torque converter includes a pump 2 formed on the torque converter cover 5 and rotatable therewith, the turbine 3 rotationally arranged within the torque converter cover 5 oppositely to the pump 2 and connected to the output shaft 6, and/or a stator 4 supported on the transmission of a vehicle via an one-way clutch 8 and connected to a stator shaft 7. The lock-up clutch apparatus 10 can be arranged within the torque converter 1 between the torque converter 5 and the turbine 3.

The torque converter cover 5 can be structured so that it is connected to a crankshaft of the engine and so that the driving power of engine is transmitted thereto. When the torque converter cover 5 and the pump 2 are rotated by the driving power of engine, the rotational torque can be transmitted to the turbine 3 via the operating fluid, with the torque being amplified. The output shaft 6 can be spline-engaged with the turbine 3 and can be rotated when the turbine 3 is rotated, the torque being transmitted to the transmission of a vehicle.

Figure 9:
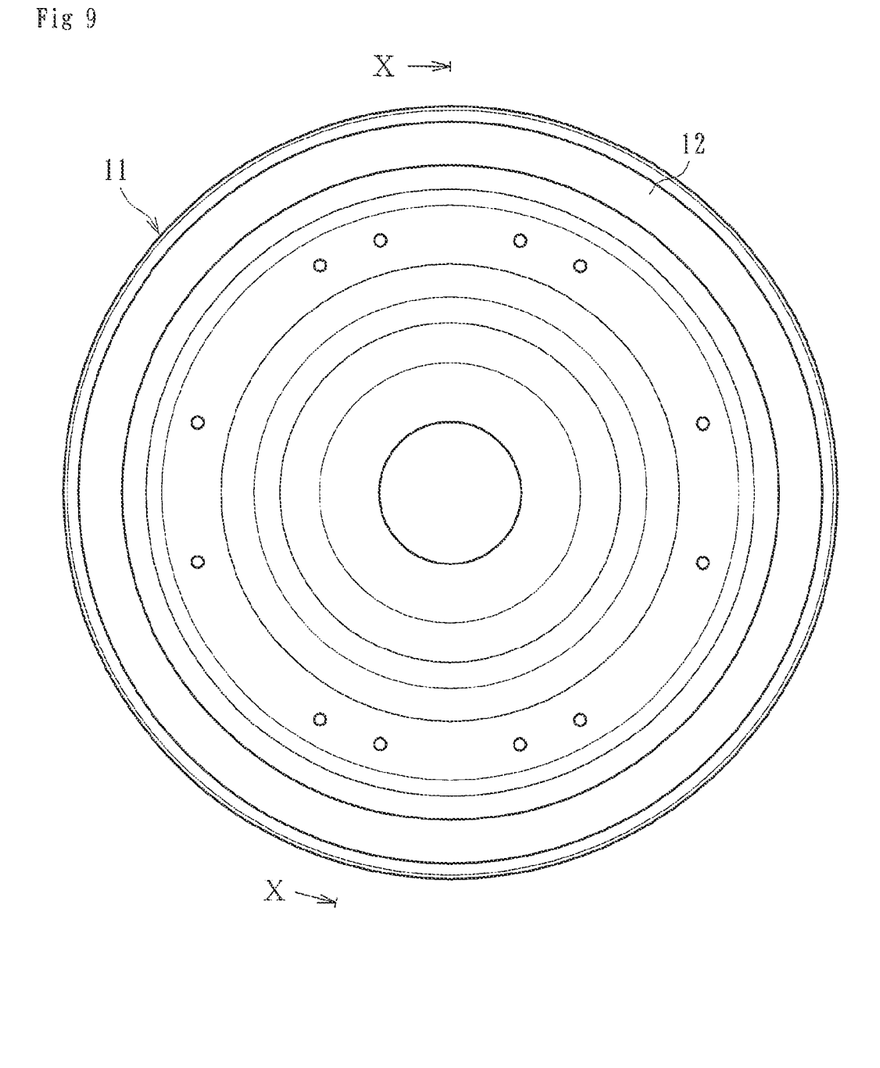
FIG. 9 is a front elevation view showing a clutch piston (e.g., input member) of the lock-up clutch apparatus of FIG. 1.
Figure 10:
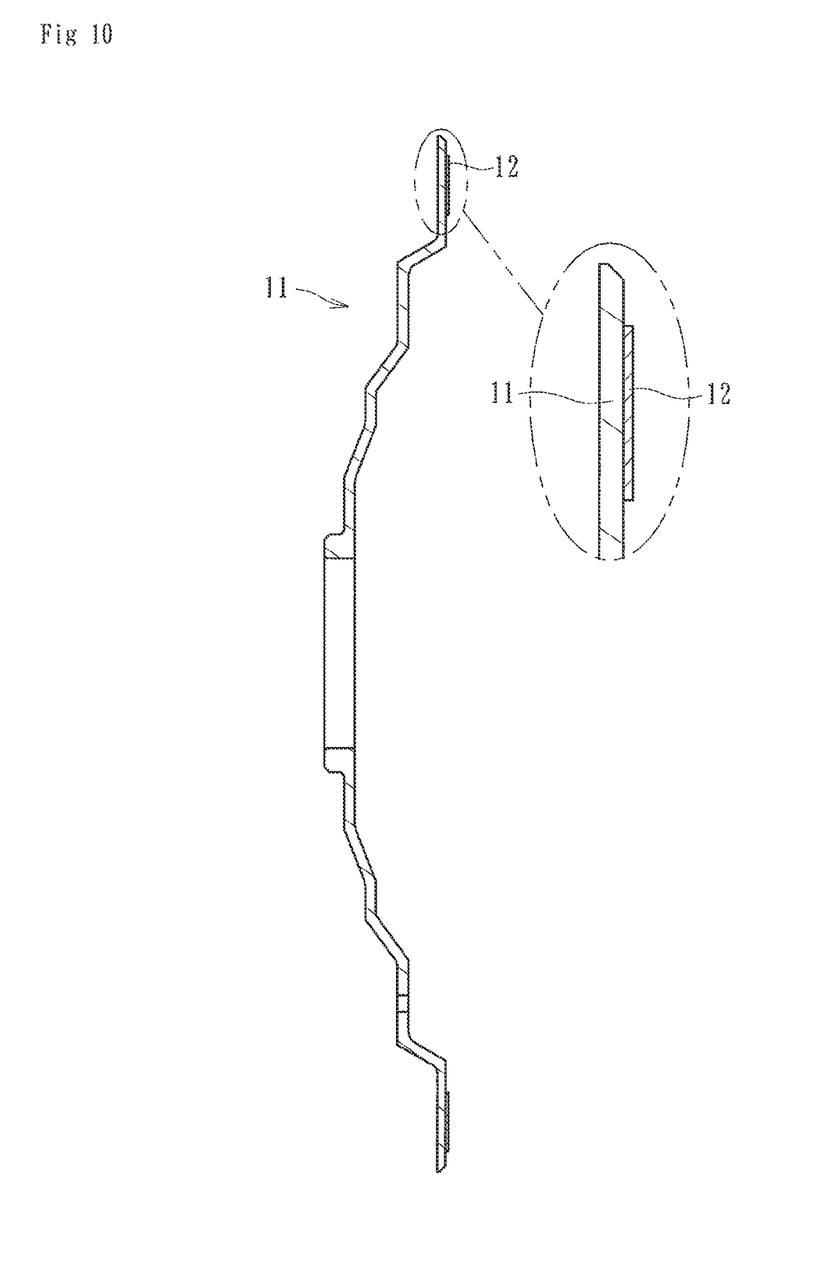
FIG. 10 is a longitudinal section view showing a clutch piston (e.g., input member) of the lock-up clutch apparatus of FIG. 1.

The lock-up clutch apparatus 10 can be configured to reduce transmitting loss of torque as compared with transmission of torque through operating fluid via direct connection of (e.g., mechanically connecting) the torque converter cover 5 and the turbine 3 at an arbitrary timing. As shown in FIGS. 9 and 10, the clutch piston 11 can be formed of a substantially disc-shaped member and can be adapted to receive the engine torque. The clutch piston 11 can be moved to left and right directions in FIG. 1 by applying a negative pressure of the operating fluid between the inner wall surface of the torque converter cover 5 and the clutch piston 11 and by releasing the negative pressure.

A substantially annular frictional member (e.g., lining) 12 can be provided on an outer circumferential surface of the clutch piston 11. When the negative pressure is applied to the operating fluid between the clutch piston 11 and the inner wall surface of the torque converter cover 5, the clutch piston 11 can be moved toward the right side (e.g., in the frame of reference of FIG. 1) and contacted with the inner wall surface of the torque converter cover 5 via the frictional member 12, and thus the clutch piston 11 and the torque converter cover 5 can be connected to each other (e.g., this position will be referred to as the "connected position"). On the other hand, when the negative pressure is released from the operating fluid between the clutch piston 11 and the inner wall surface of the torque converter cover 5, the clutch piston 11 can be moved toward the left side (e.g., in the frame of reference of FIG. 1) and separated from the inner wall surface of the torque converter cover 5, and thus the clutch piston 11 and the torque converter cover 5 can be separated from each other (e.g., this position will be referred to as the "separated position"). Accordingly, when the clutch piston 11 is in the connected position, the engine torque can be transmitted to the turbine 3 of the torque converter 1.

Figure 2:
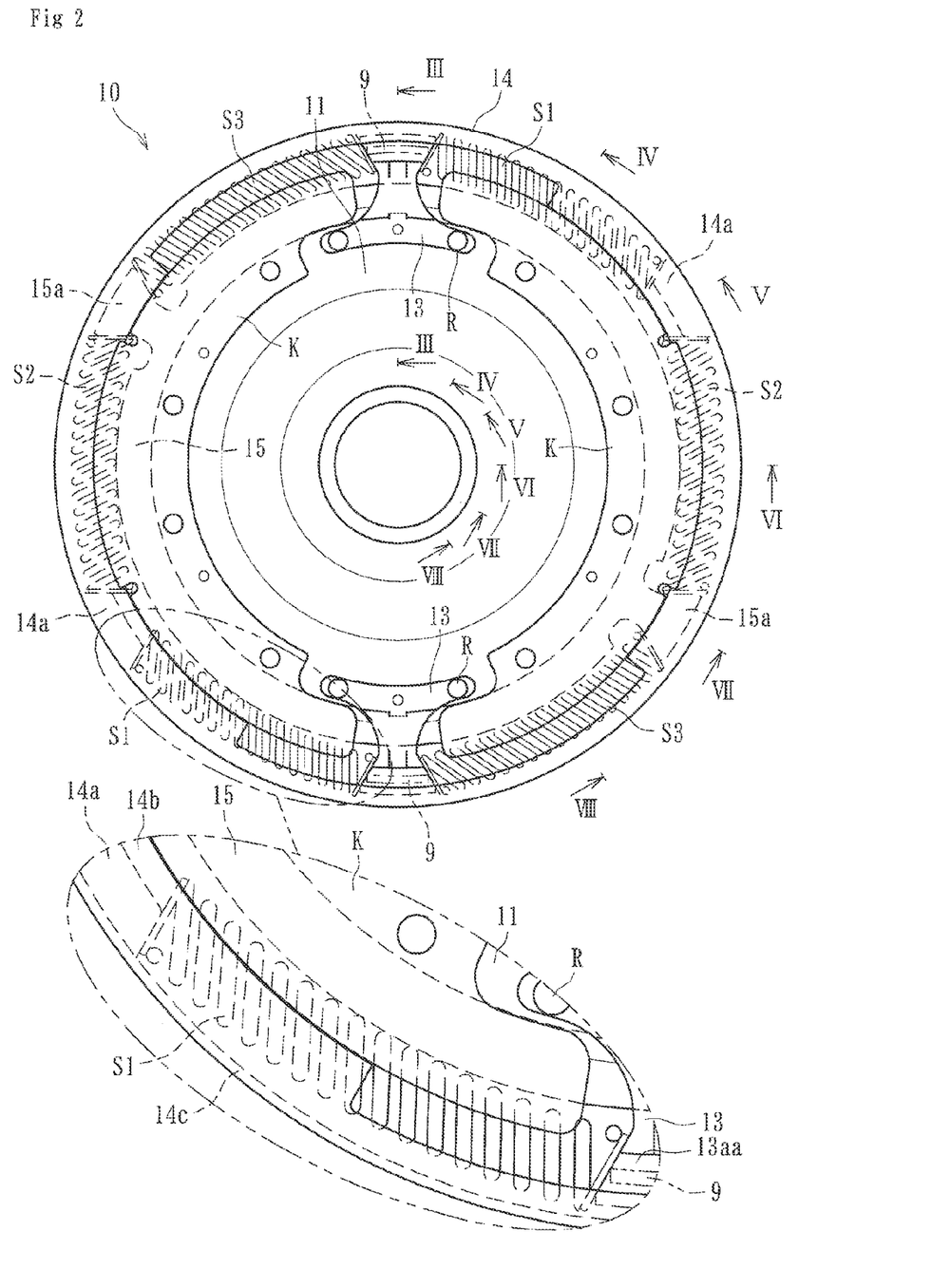
FIG. 2 is a front elevation view showing the lock-up clutch apparatus of FIG. 1.
Figure 3:
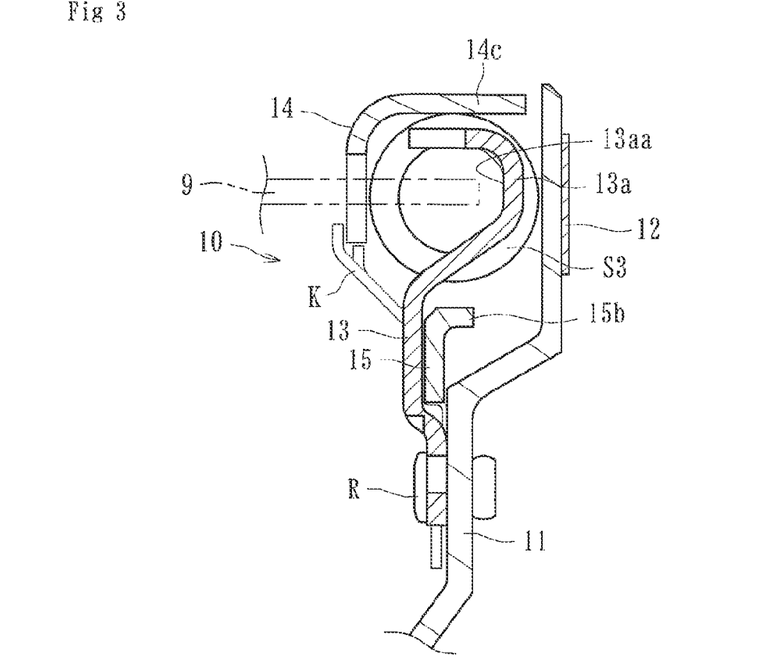
FIG. 3 is a partially enlarged section view taken along a line III-III of FIG. 2.
Figure 4:
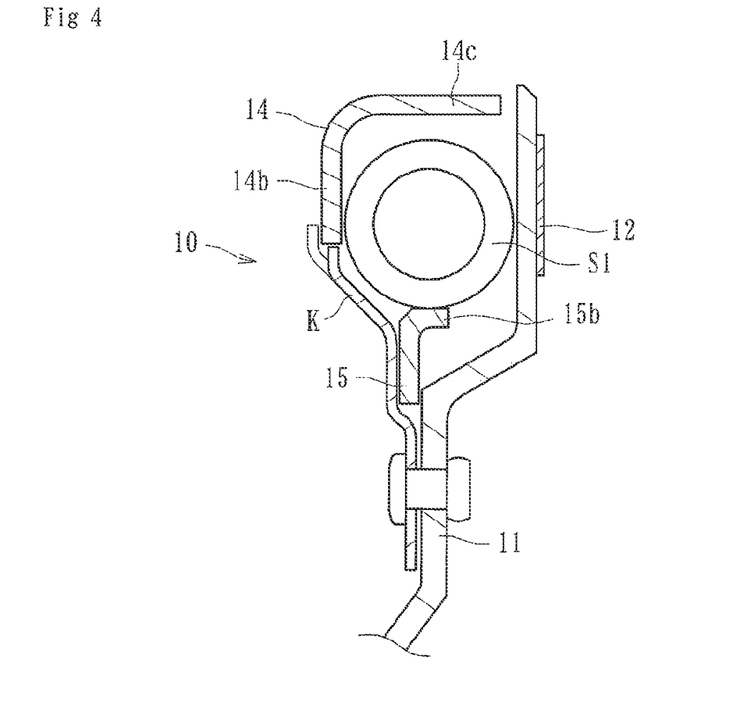
FIG. 4 is a partially enlarged section view taken along a line IV-IV of FIG. 2.
Figure 5:
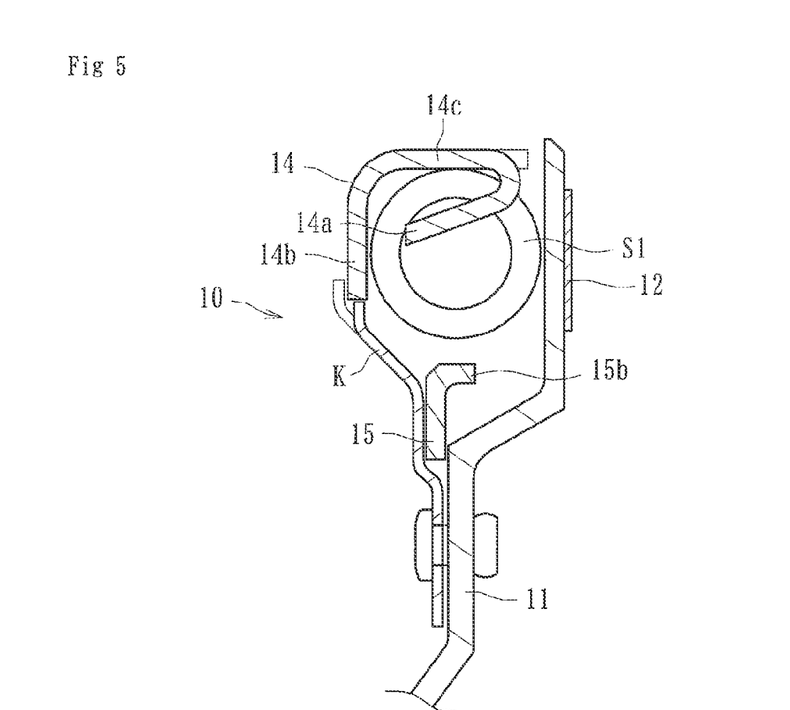
FIG. 5 is a partially enlarged section view taken along a line V-V of FIG. 2.
Figure 6:
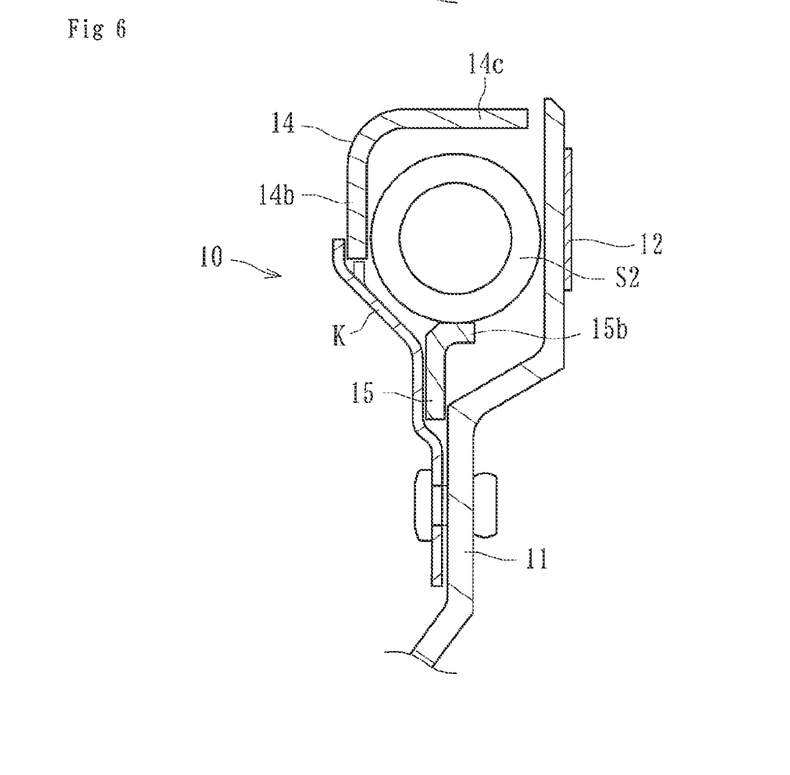
FIG. 6 is a partially enlarged section view taken along a line VI-VI of FIG. 2.
Figure 7:
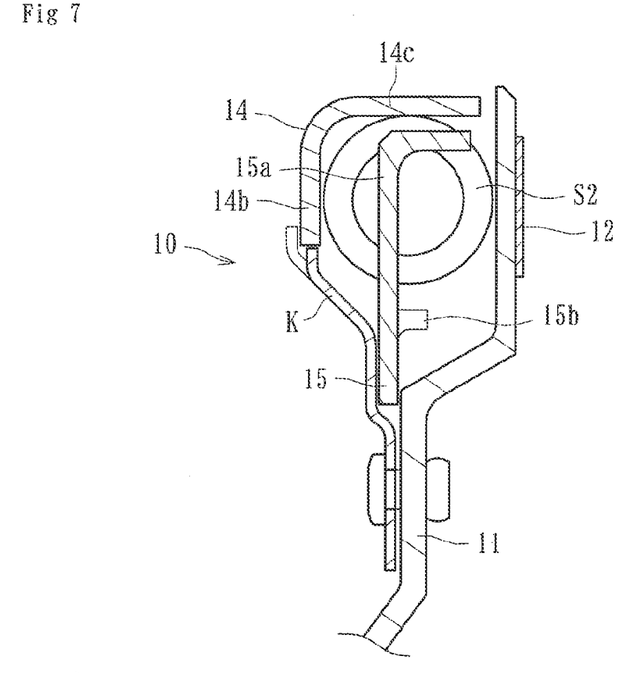
FIG. 7 is a partially enlarged section view taken along a line VII-VII of FIG. 2.
Figure 8:
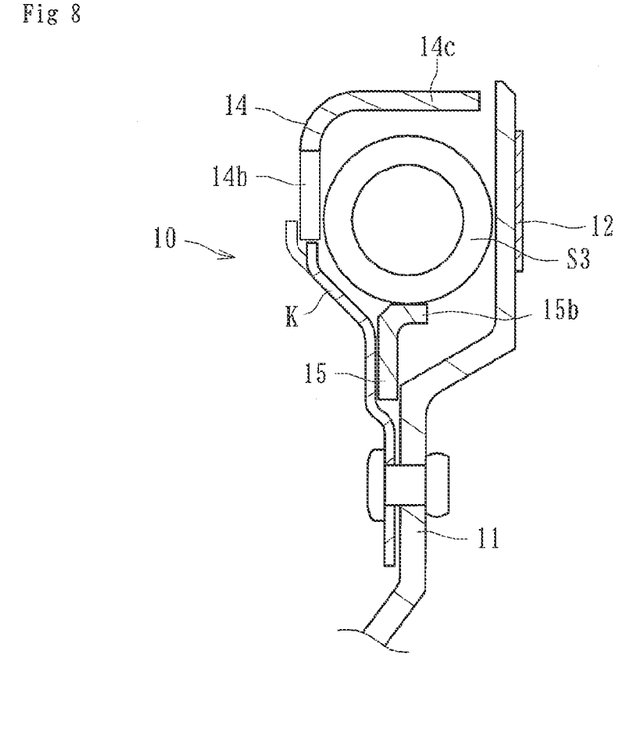
FIG. 8 is a partially enlarged section view taken along a line VIII-VIII of FIG. 2.
Figure 11:
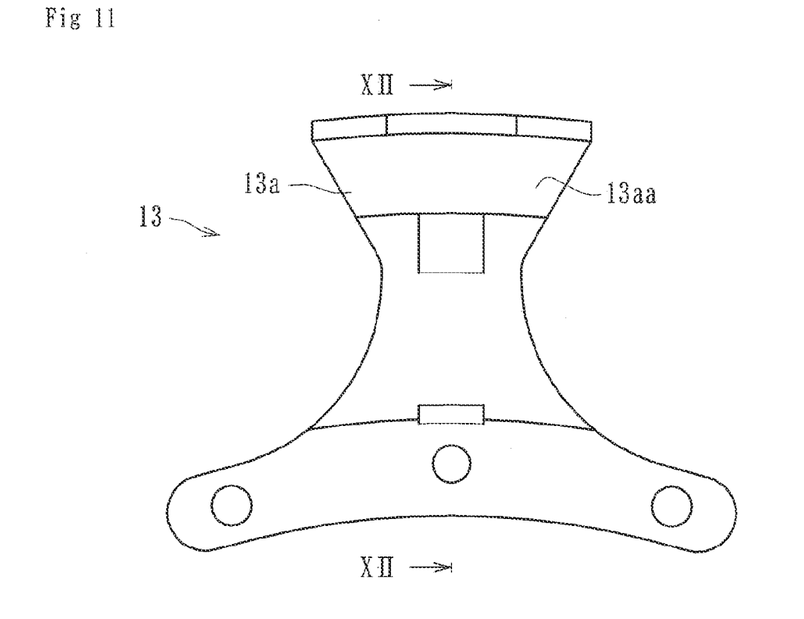
FIG. 11 is a front elevation view showing a damper holder of the lock-up clutch apparatus of FIG. 1.
Figure 12:
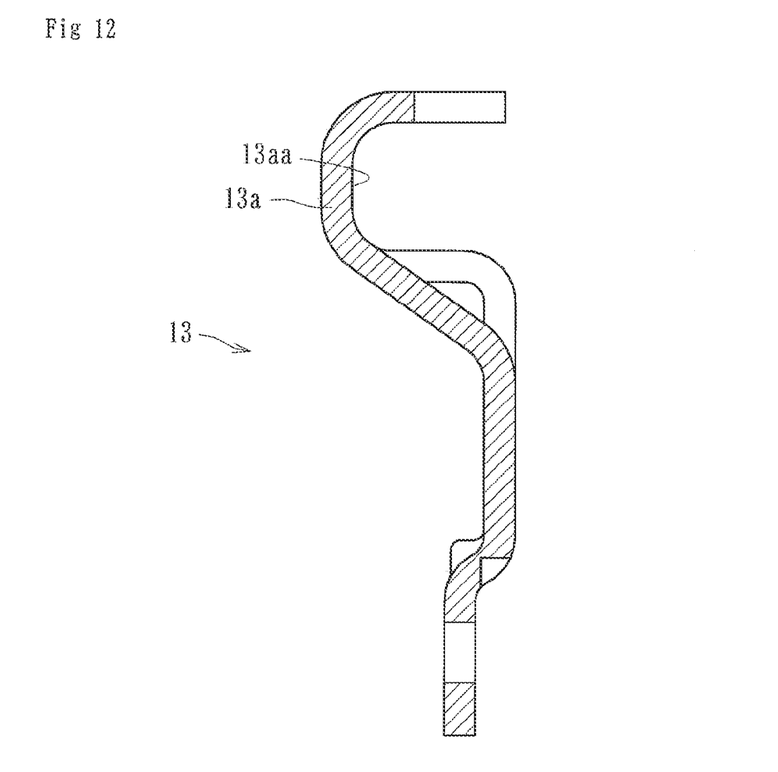
FIG. 12 is a longitudinal section view taken along a line XII-XII of FIG. 11.

As shown in FIG. 2, a pair of damper holders 13 can be secured to clutch piston 11 by rivets R. Each damper holder 13 can be formed with a bent portion 13a as shown in FIGS. 11 and 12 with which one end of the first damper spring S1 can be engaged. In addition, a recessed portion 13aa is formed on an inside of the bent portion 13a of the damper holder 13 for receiving a connecting portion 9 (FIG. 1) extending from the turbine 3. Furthermore, a cover member K (FIG. 2) can be secured on the clutch piston 11 for holding the damper springs (e.g., first, second, and third damper springs S1, S2, and S3) mounted on the clutch piston 11.

On the other hand, a recessed mounting portion can be formed along the periphery of the clutch piston on a front side (e.g., opposite to the side on which the frictional member 12 is mounted) of the clutch piston 11, in which the plurality of damper springs can be mounted on a coaxial circle. These damper springs can be configured to absorb (e.g., damp) torque variations inputted from the clutch piston (e.g., input member) 11. One pair, respectively, of the first, second and third damper springs S1, S2 and S3 can be mounted on the clutch piston 11 as shown FIG. 2.

More particularly, the damper springs (e.g., first, second, and third damper springs S1, S2, and S3) can be a plurality of coil springs coaxially arranged along the periphery of the clutch piston (e.g., input member) 11. The first, second, and third damper springs S1, S2, and S3 can be arranged, respectively, as a right-side group and a left-side group in a front view (see, e.g., FIG. 2), and can be arranged as a series connection in each group.

Each of the damper springs of the present inventions can comprise a straight coil spring substantially linear relative to the extension and contraction directions (e.g., shifting directions). When the straight coil springs are mounted on the clutch piston 11, although each coil spring tends to be deformed to a slightly arcuate configuration, a region of slide-contacting of each coil spring with an outer wall portion 14c of the first separate member 14 can be substantially reduced as compared with an arcuate coil spring. In some embodiments, it may be possible to use arcuate coil springs curved relatively to the extension and contraction direction in place of the straight coil springs.

According to the present inventions, a plurality of separate members (e.g., a first separate member 14 and a second separate member 15 in the illustrated embodiments) can be interposed between respective damper springs (e.g., between the first and second damper springs S1 and S2 and between the second and third damper springs S2 and S3) and they can be rotated independently of each other when the engine torque is applied to them.

Figure 13:
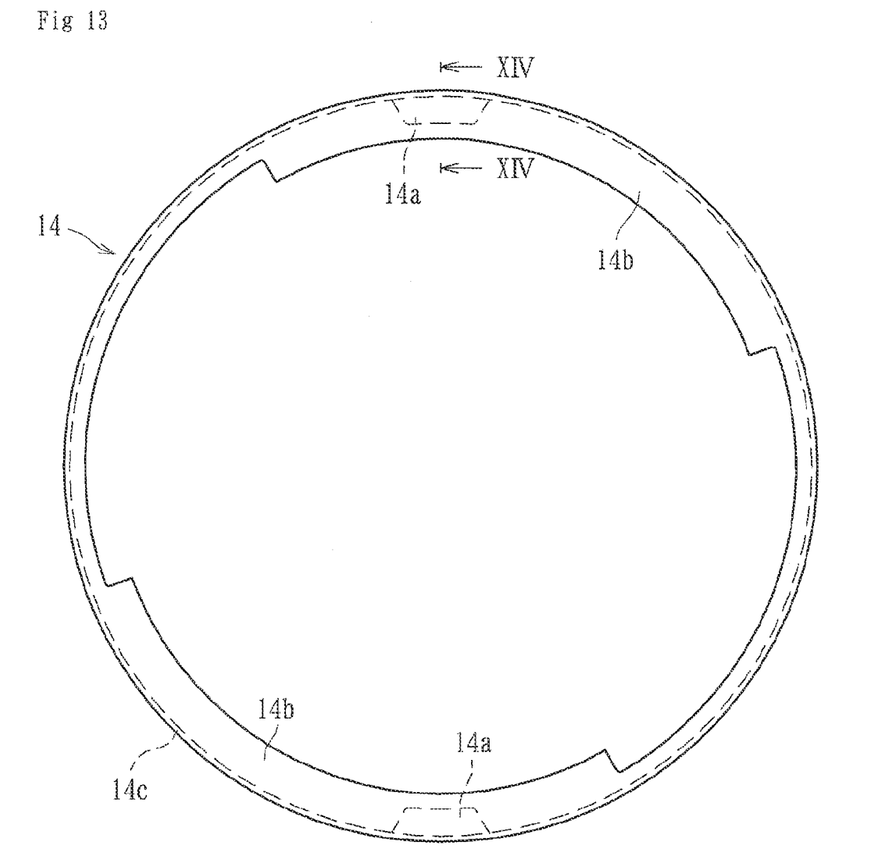
FIG. 13 is a front elevation view showing a first separate member of the lock-up clutch apparatus of FIG. 1.
Figure 14:
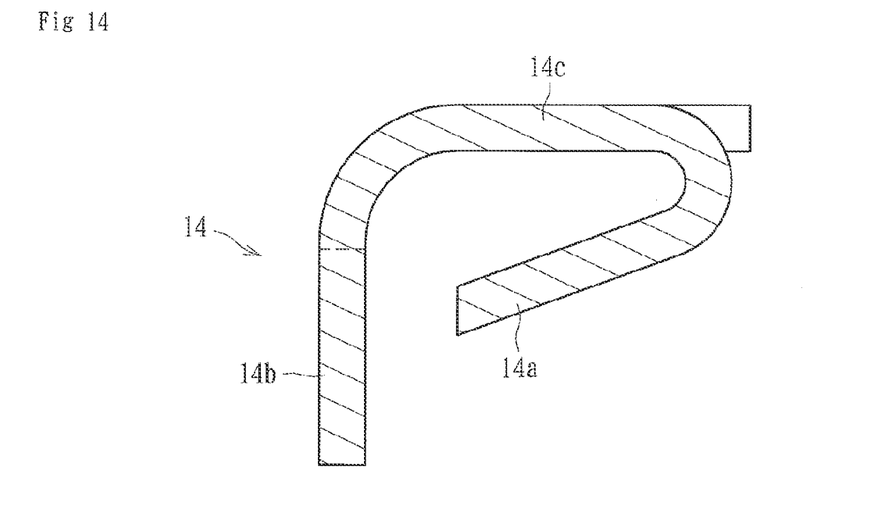
FIG. 14 is a longitudinal section view taken along a line XIV-XIV of FIG. 13.

As shown in FIGS. 13 and 14, the first separate member 14 can be formed of an annular member and can have a pair of folds 14a formed at predetermined positions, upper edge portions 14b, and/or an outer wall portion 14c. The folds 14a can be positioned between the first damper spring S1 and the second damper spring S2 when the first separate member 14 is mounted on the clutch piston 11 and can be adapted to be abutted against the other end of the first damper spring S1 and one end of the second damper spring S2.

The outer wall portion 14c can be a portion formed along a whole outer periphery of the first separate member 14 so that it is positioned at a radially outer side of the damper springs (e.g., first, second, and third damper springs S1, S2, and S3) to oppose the outer side surfaces (e.g., outer surfaces extending in the extension and contraction direction) of the damper springs. In addition, the upper edge portions 14b can extend radially inward from the outer wall portion 14c and can be formed at predetermined regions along the outer periphery of the first separate member 14 to cover the damper springs.

Figure 15:
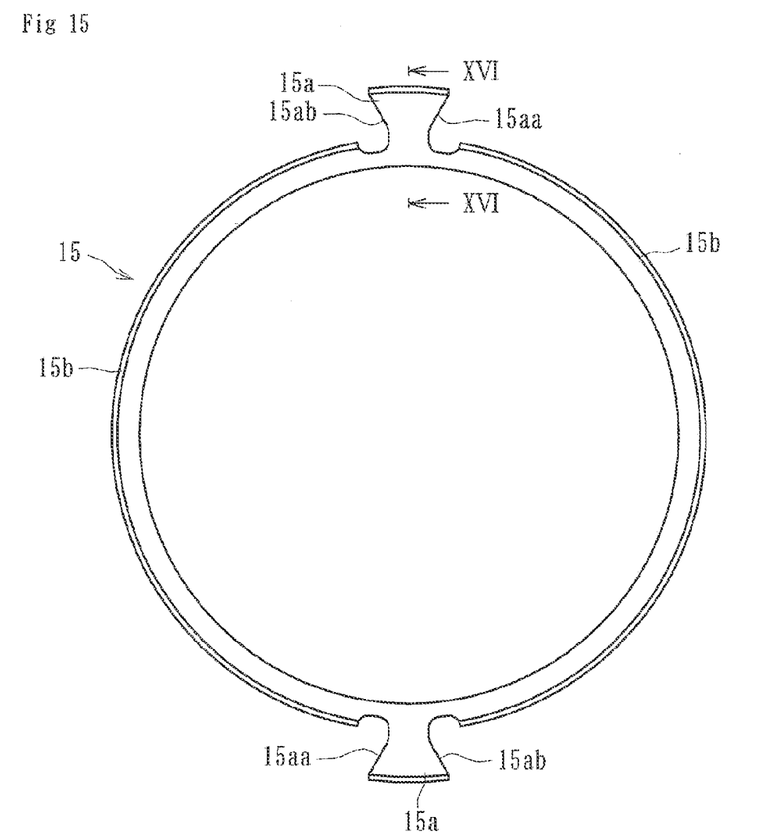
FIG. 15 is a front elevation view showing a second separate member of the lock-up clutch apparatus of FIG. 1.
Figure 16:
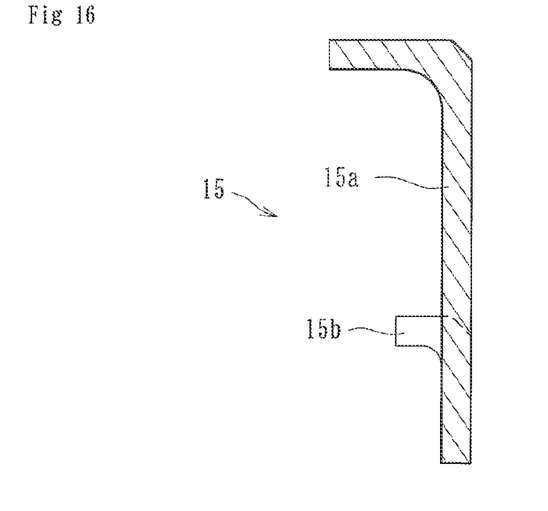
FIG. 16 is a longitudinal section view taken along a line XVI-XVI of FIG. 15.

As shown in FIGS. 15 and 16, the second separate member 15 can be formed of an annular member and can have a pair of anchoring portions 15a formed at predetermined positions, and an inner wall portion 15b. The anchoring portions 15a can be positioned between the second damper spring S2 and the third damper spring S3 when the second separate member 15 is mounted on the clutch piston 11. One end face 15aa can be adapted to be abutted against the other end of the second damper spring S2 and the other end face 15ab can be adapted to be abutted against one end of the third damper spring S3.

The inner wall portion 15b can be a portion formed along a whole outer periphery of the second separate member 15 so that it is positioned at a radially inner side of the damper springs (e.g., first, second, and third damper springs S1, S2, and S3) to oppose the inner side surfaces of the damper springs. Accordingly, the damper springs (e.g., first, second, and third damper springs S1, S2, and S3) mounted along the outer periphery of the clutch piston 11 can be held between the outer wall portion 14c of the first separate member 14 and the inner wall portion 15b of the second separate member 15, as shown in FIGS. 3-8.

In addition, the other end of the third damper spring S3 can be abutted against the connecting portion 9 positioned in the recessed portion 13aa of the damper holder 13 (FIGS. 2, 11 and 12). Accordingly, the engine torque inputted from the clutch piston 11 (e.g., input member) can be outputted to the turbine 3 via the damper holder 13, the first damper spring S1, the folds 14a of the first separate member 14, the second damper spring S2, the anchoring portion 15a of the second separate member 15, the third damper spring S3, and finally the connecting portion 9 after the torque variation has been absorbed by the first, second, and third damper springs S1, S2, and S3.

Experiments have been conducted, the results of which indicate many technical advantages of the lock-up clutch apparatus (e.g., torque damper apparatus) 10 of the present inventions. In these experiments, a structure comprising the first and second separate members 14, 15 and damper springs formed of straight coil springs is referred to as "Embodiment 1"; a structure comprising the first and second separate members 14, 15 and damper springs formed of arcuate (e.g., circular arc) coil springs is referred to as "Embodiment 2"; a structure comprising the first separate member 14 only and damper springs formed of arcuate coil springs is referred to as "Comparative Example 1"; and a structure comprising the first separate member 14 only and damper springs formed of straight coil springs is referred to as "Comparative Example 2."

Figure 17:
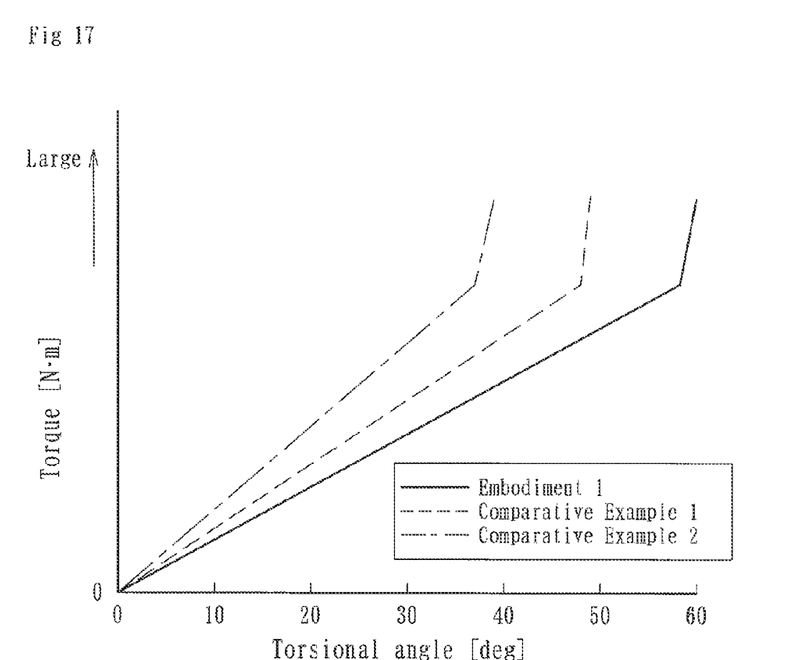
FIG. 17 is a graph of results of experiments showing some of the technical advantages (e.g., damping properties) of the lock-up clutch apparatuses of the present inventions.
Figure 18:
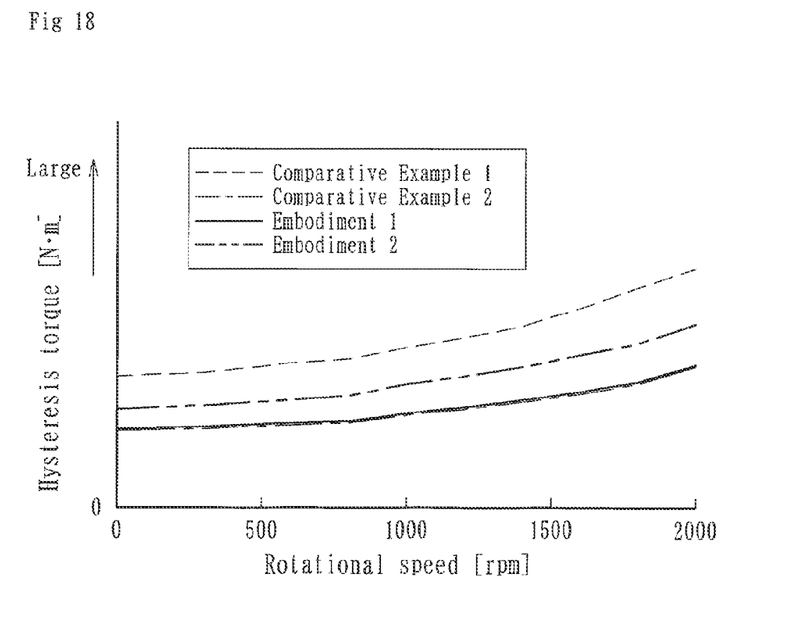
FIG. 18 is a graph of results of experiments showing some of the technical advantages (e.g., hysteresis torque properties) of the lock-up clutch apparatuses of the present inventions.

Relations shown in the graph (e.g., abscissa notes torsional angle and ordinate denotes torque) of FIG. 17 were obtained by performing an experiment pursuing a relation between the torsional angle (deg) and the torque (N·m) relating to Embodiment 1 and Comparative Examples 1 and 2. According to the results of this experiment, it can be appreciated that the damper springs of the Embodiment 1 can have lower stiffness in general as compared with those of the Comparative Examples 1 and 2, and thus the torsional angle in the Embodiment 1 is larger than those in the Comparative Examples 1 and 2. In addition, relations shown in the graph (e.g., abscissa denotes rotational speed and ordinate denotes hysteresis torque) of FIG. 18 were obtained by performing an experiment pursuing a relation between a torsional speed (rpm) and a hysteresis torque (N·m) relating to Embodiments 1 and 2 and Comparative Examples 1 and 2. According to the results of this experiment, it can be appreciated that although the properties of Embodiment 1 and Comparative Example 2 are substantially identical, the hysteresis torque in Embodiment 1 can be suppressed over whole rotational speed range as compared with that in Comparative Example 1.

Figure 19:
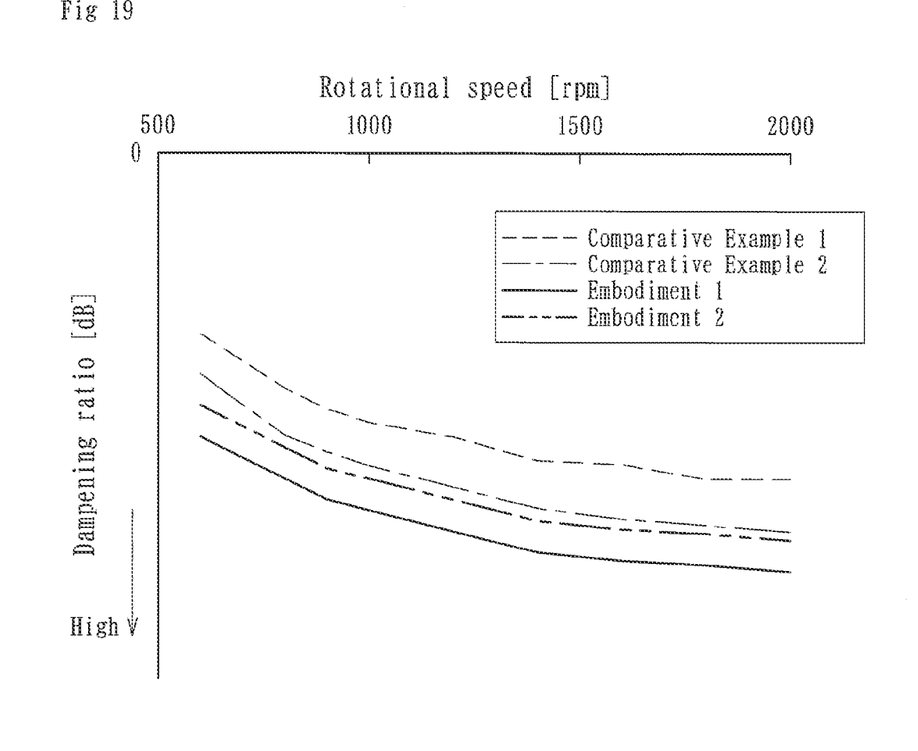
FIG. 19 is a graph of results of experiments showing some of the technical advantages (e.g., dampening ratio properties) of the lock-up clutch apparatuses of the present inventions.

Furthermore, relations shown in the graph (e.g., abscissa denotes rotational speed and ordinate denotes dampening ratio) of FIG. 19 were obtained by performing an experiment pursuing a relation between the rotational speed (rpm) and the dampening ratio (dB) relating to Embodiments 1 and 2 and Comparative Examples 1 and 2. According to the results of this experiment, it can be appreciated that Embodiments 1 and 2 have higher dampening ratios over a whole rotational speed range as compared with those of the Comparative Examples 1 and 2 and are superior in the dampening performance. In addition, since Embodiment 1 has a higher dampening ratio than that of Embodiment 2 over a whole rotational speed range, it can be also appreciated that it will be able to improve the dampening performance by using straight coil springs as damper springs.

As described above, according to some embodiments, since the damper springs comprise a plurality of coil springs (e.g., first, second, and third damper springs S1, S2, and S3) arranged along the circumference of the input member (e.g., clutch piston) 11 and the torque damper apparatus comprises a plurality of separate members (e.g., first and second separate members 14, 15) interposed between the damper springs and able to be independently rotated with respect to each other when the engine torque is transmitted thereto, it is possible to further reduce the stiffness of the torque damper apparatus and to obtain sufficient vibration absorbing property while increasing the dampening ratio of torque variation.

According to some embodiments, since the damper springs comprise straight coil springs each having a substantially linear configuration relative to its extension and contraction direction, it is possible to suppress slide contact of the coil springs against the wall surface (e.g., outer wall portion 14c of the preferable embodiments) of the clutch piston 11 during absorption of the torque variation and thus to reduce the sliding resistance. Accordingly, it is possible to reduce hysteresis torque of the damper springs and thus to further increase the dampening ratio of the torque variation.

Further, according to some embodiments, since the separate members comprise a first separate member 14 and a second separate member 15, the damper springs comprise a first damper spring S1, a second damper spring S2, and a third damper spring S3, and the torque inputted from the input member (e.g., clutch piston) 11 is outputted to the output shaft 6 via the first damper spring S1, the first separate member 14, the second damper spring S2, the second separate member 15, and the third damper spring S3, it is possible to achieve further reduction of the stiffness of the torque damper apparatus by a simple structure and to obtain sufficient vibration absorbing property while increasing the dampening ratio of torque variation.

According to some embodiments, since the first separate member 14 has an outer wall portion 14c positioned at an outer side of the damper springs so that it opposes to the outer side surfaces of the damper springs, and the second separate member 15 has an inner wall portion 15b positioned at an inner side of the damper springs so that it opposes to the inner side surfaces of the damper springs, it is possible to firmly hold the damper springs between wall portions 14c, 15b of the first and second separate members 14, 15.

According to some embodiments, since the input member comprises a clutch piston 11 arranged within a torque converter cover 5 and adapted to be moved between a connected position and a separated position relative to the torque converter cover 5 so that the clutch piston 11 can be rotated by the torque transmitted from the engine in the connected position to transmit the engine torque to a turbine 3 of the torque converter 1, it is possible to apply the torque damper apparatus of the present invention to a lock-up clutch apparatus 10 of the torque converter 1.

Although preferable embodiments of the present inventions have been described, the present inventions are not limited to the described and illustrated embodiments. For example, it may be possible to provide three or more separate members independently rotatable with respect to each other and to arrange damper springs so that they act in a series manner via respective separate members. In addition, although it has been described that the first separate member 14 is disposed on the outer side of the damper springs and the second separate member 15 is disposed on the inner side of the damper springs, it may be possible to arrange the first and second separate members 14, 15 in an opposite manner. In such a case, the engine power can be transmitted in order of the input member 11, first damper spring S1, second separate member 15, second damper spring S2, first separate member 14, and third damper spring S3.

Furthermore, although it has been described that the torque damper apparatuses of the present inventions can be applied to the lock-up clutch apparatus 10, it may be possible to apply the torque damper apparatuses of the present inventions to various kinds of apparatuses (e.g., an apparatus which is mounted on a vehicle not provided with a torque converter and is able to absorb torque variation during transmission of engine torque) if the torque damper apparatuses are those in which the driving power of an engine can be transmitted via the input member and damper springs and the torque variation can be absorbed by the damper springs. In addition, although it has been described that three damper springs are arranged in left-side group and right-side group of the input member (e.g., lock-up clutch apparatus 10) respectively, the number of the damper springs and the group are not limited to the described and illustrated embodiments.

The torque damper apparatuses may be applied to those having different outlines or other mechanical functions if the torque damper apparatus are those in which the damper springs are formed of a plurality of coil springs arranged along an outer periphery of the input member and a plurality of separate members are interposed between the damper springs and independently rotated with respect to each other when engine torque is transmitted.

What is claimed is:

1. A torque damper apparatus comprising:
   an input member to which an engine torque is inputted;
   damper springs configured to absorb variation of torque inputted from the input member; and
   a driving power of the engine configured to be transmitted to an output shaft of a vehicle via the input member and the damper springs, wherein:
   the damper springs comprise a plurality of coil springs arranged along a circumference of the input member;
   the torque damper apparatus further comprises a first separate member and a second separate member interposed between the damper springs and configured to be independently rotated with respect to each other when the engine torque is transmitted thereto;
   wherein the first separate member has an outer wall portion positioned at an outer side of the damper springs so that it opposes the outer side surfaces of the damper springs; and
   wherein the second separate member has an inner wall portion positioned at an inner side of the damper springs so that it opposes to the inner side surfaces of the damper springs.

2. The torque damper apparatus of claim 1 wherein the input member comprises a clutch piston arranged within a torque converter cover and adapted to be moved between a connected position and a separated position relative to the torque converter cover so that the clutch piston can be rotated by the torque transmitted from the engine in the connected position to transmit the engine torque to a turbine of the torque converter.

3. The torque damper apparatus of claim 1 wherein the the damper springs comprise a first damper spring, a second damper spring, and a third damper spring, and the torque inputted from, the input member is outputted to the output shaft via the first damper spring, the first separate member, the second damper spring, the second separate member and the third damper spring.

4. The torque damper apparatus of claim 3 wherein the input member comprises a clutch piston arranged within a torque converter cover and adapted to be moved between a connected position and a separated position relative to the torque converter cover so that the clutch piston can be rotated by the torque transmitted from the engine in the connected position to transmit the engine torque to a turbine of the torque converter.

5. The torque damper apparatus of claim 1 wherein the damper springs comprise straight coil springs each having a substantially linear configuration relative to its expansion and contraction direction.

6. The torque damper apparatus of claim 5 wherein the input member comprises a clutch piston arranged within a torque converter cover and adapted to be moved between a connected position and a separated position relative to the torque converter cover so that the clutch piston can be rotated by the torque transmitted from the engine in the connected position to transmit the engine torque to a turbine of the torque converter.

7. The torque damper apparatus of claim 5 wherein the damper springs comprise a first damper spring, a second damper spring, and a third damper spring, and the torque inputted from the input member is outputted to the output shaft via the first damper spring, the first separate member, the second damper spring, the second separate member and the third damper spring.

8. The torque damper apparatus of claim 7 wherein the input member comprises a clutch piston arranged within a torque converter cover and adapted to be moved between a connected position and a separated position relative to the torque converter cover so that the clutch piston can be rotated by the torque transmitted from the engine in the connected position to transmit the engine torque to a turbine of the torque converter.

* * * * *

UNITED STATES PATENT AND TRADEMARK OFFICE
CERTIFICATE OF CORRECTION

| | |
|---|---|
| PATENT NO. | : 9,677,642 B2 |
| APPLICATION NO. | : 14/828924 |
| DATED | : June 13, 2017 |
| INVENTOR(S) | : Hiroshi Asai |

Page 1 of 1

It is certified that error appears in the above-identified patent and that said Letters Patent is hereby corrected as shown below:

In Column 10 at Line 6 (approx.), In Claim 3, after "wherein" delete "the".

In Column 10 at Line 10 (approx.), In Claim 3, change "from," to --from--.

Signed and Sealed this
Twelfth Day of December, 2017

Joseph Matal
*Performing the Functions and Duties of the
Under Secretary of Commerce for Intellectual Property and
Director of the United States Patent and Trademark Office*